United States Patent
Bascom et al.

(10) Patent No.: US 7,481,002 B2
(45) Date of Patent: Jan. 27, 2009

(54) LASER LEVEL

(75) Inventors: James P. Bascom, Bel Air, MD (US);
John K. Horky, Lutherville, MD (US);
John McKibben, Dallastown, PA (US);
Daniel N. Lopano, Towson, MD (US);
Geoffrey S. Howard, Columbia, MD (US); Michael A. Nelson, Towson, MD (US); John C. Wenig, Bel Air, MD (US)

(73) Assignee: Black & Decker Inc., Newark, DE (US)

(*) Notice: Subject to any disclaimer, the term of this patent is extended or adjusted under 35 U.S.C. 154(b) by 0 days.

(21) Appl. No.: 11/982,806

(22) Filed: Nov. 5, 2007

(65) Prior Publication Data

US 2008/0066329 A1 Mar. 20, 2008

Related U.S. Application Data

(63) Continuation of application No. 11/598,479, filed on Nov. 13, 2006, now Pat. No. 7,310,886, which is a continuation of application No. 11/034,696, filed on Jan. 13, 2005, now Pat. No. 7,134,211, which is a continuation-in-part of application No. 29/213,371, filed on Sep. 16, 2004, now Pat. No. Des. 509,453, which is a continuation of application No. 29/201,635, filed on Mar. 18, 2004, now Pat. No. Des. 498,687.

(51) Int. Cl.
*G01C 9/12* (2006.01)
*G01C 15/00* (2006.01)
(52) U.S. Cl. ............................................ 33/286; 33/291
(58) Field of Classification Search .................... 33/286
See application file for complete search history.

(56) References Cited

U.S. PATENT DOCUMENTS 2,103,184 A    12/1937    Roggero 3,238,831 A    3/1966    Graf
3,241,243 A    3/1966    Speer
3,911,516 A    10/1975    Einhorn (Continued)

FOREIGN PATENT DOCUMENTS

DE         2258700        6/1973

(Continued)

OTHER PUBLICATIONS

Spectra Precision, Interior Laser Level Family, Oct. 1997, Spectra Precision Inc., Dayton, Ohio, USA.

(Continued)

*Primary Examiner*—Christopher W Fulton
(74) *Attorney, Agent, or Firm*—Michael Aronoff; Adan Ayala

(57) ABSTRACT

A laser level includes a housing, a pendulum pivotably mounted to the housing, and a laser diode assembly disposed on the pendulum. A gimbal assembly is employed for pivotably mounting the pendulum to the housing. The gimbal assembly includes a frame connected to the housing, a first pair of bearings disposed on the frame, an axle extending through the first pair of bearings, a body disposed on the axle and pivotably supporting the pendulum, and a second pair of bearings disposed between the body and the pendulum. The first pair of bearings is disposed on one side of the second pair of bearings.

21 Claims, 7 Drawing Sheets

U.S. PATENT DOCUMENTS

| | | | |
|---|---|---|---|
| 3,911,588 A | | 10/1975 | Ohneda |
| 4,031,629 A | | 6/1977 | Paluck |
| 4,106,207 A | | 8/1978 | Boyett et al. |
| 4,665,339 A | | 5/1987 | Masterton et al. |
| 5,220,460 A | | 6/1993 | Bedzyk |
| 5,531,031 A | * | 7/1996 | Green .................... 33/365 |
| 5,537,205 A | | 7/1996 | Costa et al. |
| 5,539,990 A | | 7/1996 | Le |
| 5,552,886 A | | 9/1996 | Kitajima et al. |
| 5,619,802 A | | 4/1997 | Rando et al. |
| 5,644,425 A | * | 7/1997 | Palmer .................... 359/409 |
| 5,644,850 A | | 7/1997 | Costales |
| 5,782,003 A | | 7/1998 | Bozzo |
| 5,788,364 A | * | 8/1998 | Cooper et al. ............... 362/293 |
| 5,790,248 A | | 8/1998 | Ammann |
| 5,853,241 A | * | 12/1998 | Sharrah et al. ............. 362/105 |
| 5,864,956 A | | 2/1999 | Dong |
| 5,912,733 A | | 6/1999 | Dunlop et al. |
| 5,983,510 A | | 11/1999 | Wu et al. |
| 5,992,029 A | | 11/1999 | Dong |
| 6,014,211 A | | 1/2000 | Middleton et al. |
| 6,028,665 A | | 2/2000 | McQueen |
| 6,069,748 A | | 5/2000 | Bietry |
| 6,177,987 B1 | | 1/2001 | Ting |
| 6,182,916 B1 | * | 2/2001 | Lin ........................... 242/379 |
| 6,360,446 B1 | * | 3/2002 | Bijawat et al. ............... 33/451 |
| 6,382,547 B1 | * | 5/2002 | Yang ........................ 242/379 |
| 6,384,420 B1 | | 5/2002 | Doriguzzi Bozzo |
| 6,493,952 B1 | | 12/2002 | Kousek et al. |
| 6,546,636 B2 | | 4/2003 | Tamamura |
| 6,588,115 B1 | | 7/2003 | Dong |
| 6,735,879 B2 | | 5/2004 | Malard et al. |
| 6,754,969 B2 | | 6/2004 | Waibel |
| 6,792,685 B1 | | 9/2004 | Ng et al. |
| 6,804,893 B2 | | 10/2004 | Watson et al. |
| 6,935,034 B2 | | 8/2005 | Malard et al. |
| 6,941,665 B1 | | 9/2005 | Budrow et al. |
| 6,964,106 B2 | | 11/2005 | Sergyeyenko et al. |
| 7,134,211 B2 | * | 11/2006 | Bascom et al. ............... 33/286 |
| 7,310,886 B2 | * | 12/2007 | Bascom et al. ............... 33/286 |
| 2002/0191148 A1 | * | 12/2002 | Sheldon et al. ............... 351/62 |
| 2003/0029049 A1 | | 2/2003 | Huang et al. |
| 2003/0061720 A1 | | 4/2003 | Waibel |
| 2003/0112535 A1 | * | 6/2003 | Clemmer .................... 359/872 |
| 2004/0123472 A1 | | 7/2004 | Wu |
| 2004/0187327 A1 | | 9/2004 | Levine |
| 2004/0205972 A2 | | 10/2004 | Wu |
| 2004/0258126 A1 | | 12/2004 | Levine |
| 2005/0022399 A1 | | 2/2005 | Wheeler et al. |
| 2005/0066533 A1 | | 3/2005 | Wheeler et al. |
| 2005/0155238 A1 | | 7/2005 | Levine et al. |
| 2005/0206891 A1 | | 9/2005 | Khubani |
| 2005/0231712 A1 | | 10/2005 | Engels |
| 2005/0270532 A1 | | 12/2005 | Malard et al. |
| 2005/0274030 A1 | | 12/2005 | Spanski et al. |
| 2005/0278966 A1 | | 12/2005 | Liu |
| 2006/0037202 A1 | | 2/2006 | Long et al. |
| 2006/0037203 A1 | | 2/2006 | Long et al. |

FOREIGN PATENT DOCUMENTS

| | | |
|---|---|---|
| DE | 3326618 | 2/1984 |
| DE | 3409990 | 7/1984 |
| DE | 9408464 U | 7/1994 |
| DE | 9418591 | 2/1995 |
| DE | 20215235 U | 1/2003 |
| EP | 0558743 B1 | 6/1996 |
| EP | 0819911 B1 | 6/2002 |
| EP | 1298413 A1 | 4/2003 |
| JP | 08271254 A | 10/1996 |
| WO | WO9322619 | 11/1993 |
| WO | WO9853273 | 11/1998 |
| WO | WO9858232 | 12/1998 |

OTHER PUBLICATIONS

Spectra Precision, Minute Marker General Construction/Interior Laser System Model 1462, Oct. 1997, Spectra Precision Inc. Dayton, Ohio, USA.

* cited by examiner

LASER LEVEL

CROSS REFERENCE TO RELATED APPLICATIONS

The following is a continuation of U.S. application Ser. No. 11/598,479, filed on Nov. 13, 2006, now U.S Pat. No. 7,310,886, which is a continuation of Ser. No. 11/034,696, filed on Jan. 13, 2005, now U.S. Pat. No. 7,134,211, which is a continuation-in-part of U.S. application Ser. No. 29/213,371, filed on Sep. 16, 2004, now U.S. Pat. No. D509,453, which is in turn a continuation of U.S. application Ser. No. 29/201,635, filed on Mar. 18, 2004, now U.S. Pat. No. D498,687.

FIELD OF THE INVENTION

This invention relates generally to laser levels and more specifically to a laser level which generates a laser line on a surface.

BACKGROUND OF THE INVENTION

U.S. Pat. No. 5,539,990, which is wholly incorporated herein by reference, discloses an optical levelling, plumbing and angle-calibrating instrument including a frame, a plumb body universally pendulously mounted on the frame and defining a vertical plumb line gravitationally, at least an illuminator electrically connected to a power supply and mounted on the plumb body for emitting laser light, and at least a cylindrical-surfaced lens mounted on the plumb body in front of the illuminator for planarly diverging the laser light as emitted from the illuminator through the lens to form a laser light plane transverse to a lens axis of the cylindrical-surfaced lens, whereby the laser light plane will projectively intersect an objective wall to form a straight line of optical image, serving as a reference line for leveling or plumbing use. Such laser level may be difficult to install on a wall, etc.

It is an object of the present invention to provide a laser level that is inexpensive and usable by the general public in multiple applications.

SUMMARY OF THE INVENTION

In accordance with the present invention, an improved laser level is employed. The laser level has A laser level includes a housing, a pendulum pivotably mounted to the housing and a laser diode assembly disposed on the pendulum. A gimbal assembly is employed for pivotably mounting the pendulum to the housing. The gimbal assembly includes a frame connected to the housing, a first pair of bearings disposed on the frame, an axle extending through the first pair of bearings, a body disposed on the axle and pivotably supporting the pendulum, and a second pair of bearings disposed between the body and the pendulum. The first pair of bearings is disposed on one side of the second pair of bearings.

Additional features and benefits of the present invention are described, and will be apparent from, the accompanying drawings and the detailed description below.

BRIEF DESCRIPTION OF THE DRAWINGS

The accompanying drawings illustrate preferred embodiments of the invention according to the practical application of the principles thereof, and in which:

FIG. 3 illustrates a gimbal assembly according to the invention, where

FIG. 4 illustrates a laser assembly according to the invention, where

FIG. 5 illustrates aspects of a housing according to the invention, where

FIG. 7 illustrates a wall mount assembly according to the invention, where

DETAILED DESCRIPTION

Figure 1:
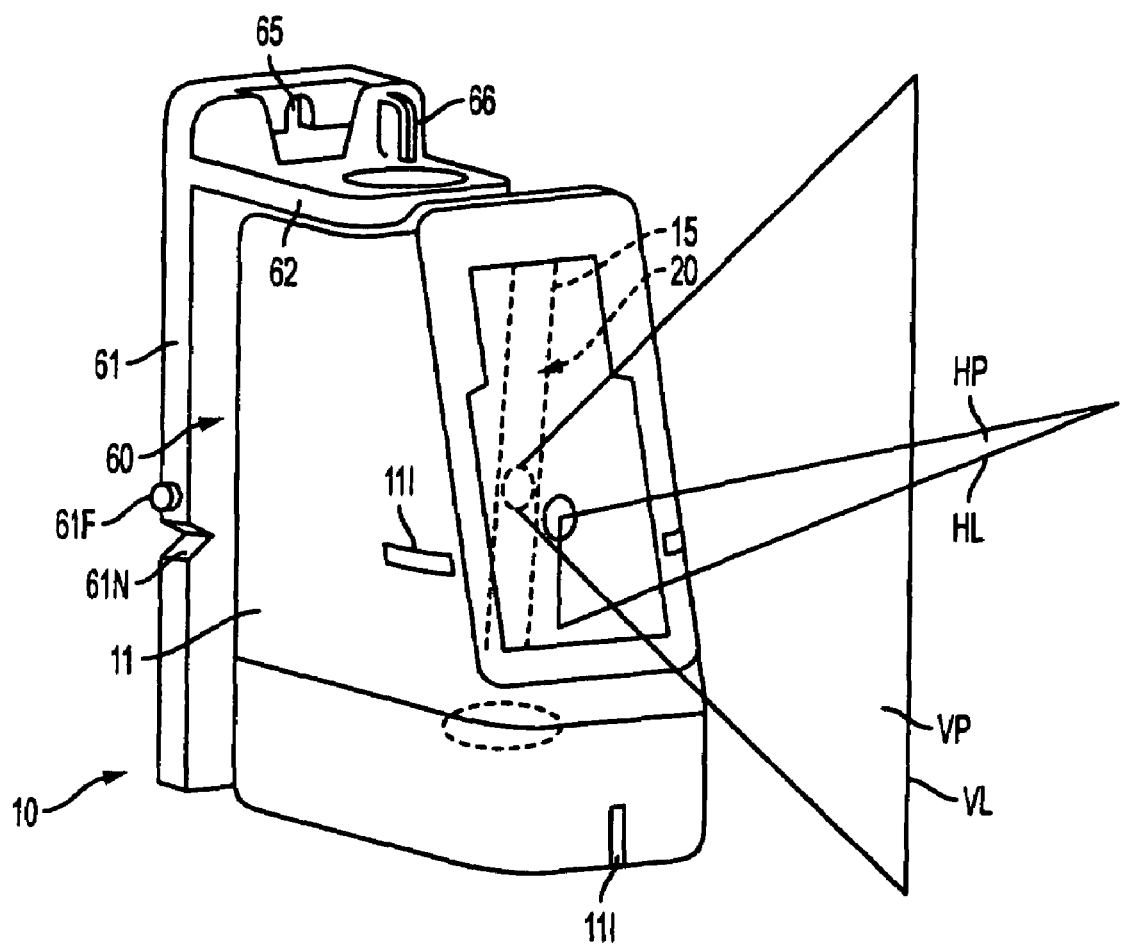
FIG. 1 is a perspective view of the laser level according to the invention.
Figure 2:
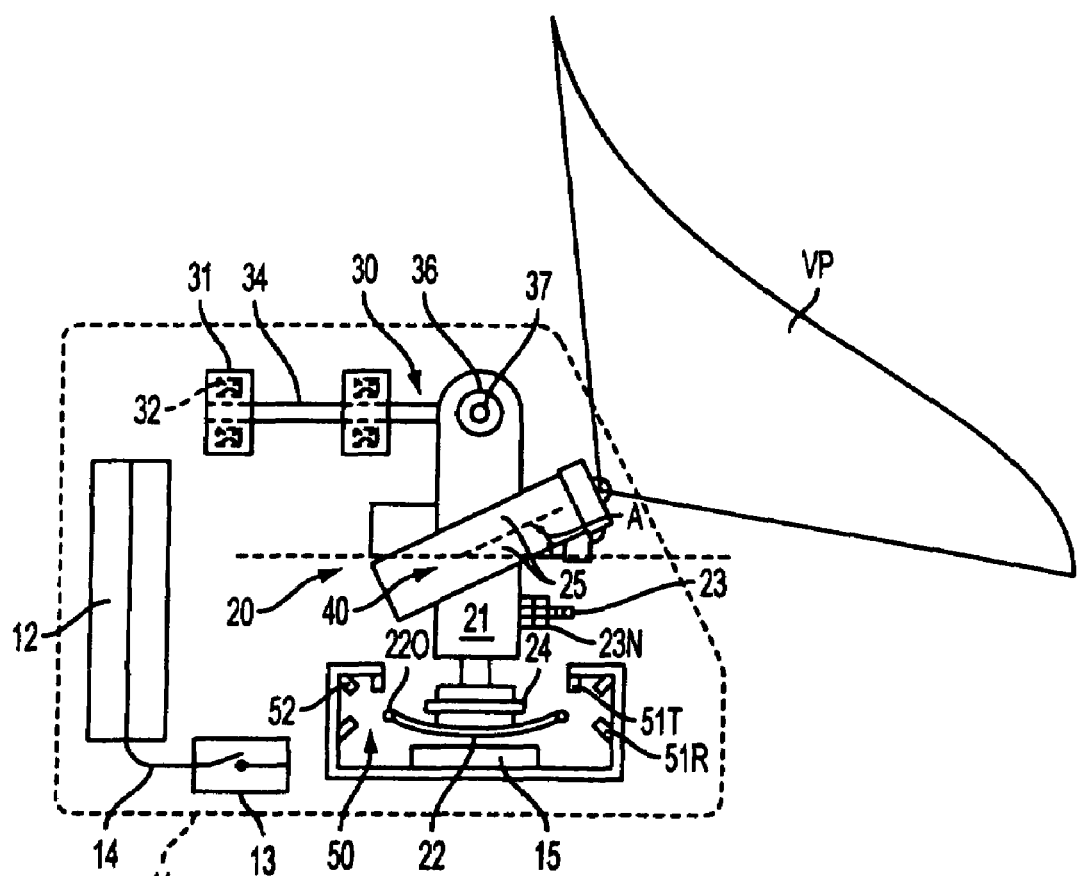
FIG. 2 is a partial cross-section of the laser level according to the invention.

The invention is now described with reference to the accompanying figures, wherein like numerals designate like parts. Referring to FIGS. 1-2, a laser level 10 may have a housing 11, a pendulum assembly 20 hung inside the housing 11, and two line generating laser assemblies 40 disposed on the pendulum assembly 20. Each laser assembly 40 preferably generates a laser light plane so that, upon contact with a surface, such as a wall, a laser line is generated on the surface.

Preferably, one of the laser assemblies 40 is aligned so that it generates a horizontal planar beam HP, so that a horizontal line HL appears on the surface. Similarly, the other laser assembly 40 may be aligned to generate a vertical planar beam VP, so that a vertical line VL appears on the surface. Horizontal planar beam HP and/or vertical planar beam VP preferably exit housing 11 via a window 15 mounted unto housing 11.

Persons skilled in the art will recognize that, because the laser assemblies 40 are mounted on pendulum assembly 20, the laser level 10 will self-level, generating truly horizontal and/or vertical lines. Persons skilled in the art should refer to U.S. Pat. No. 5,539,990, which is wholly incorporated herein by reference, for further information.

Laser assemblies 40 may be powered by at least one battery 12 mounted in housing 11. Persons skilled in the art will recognize that battery 12 may alternatively be mounted on pendulum assembly 20.

A switch 13 may connected to battery 12 and the laser assemblies 40 via wires 14. Switch 13 may be used to control whether one or both lasers assemblies 40 are turned on, thus projecting horizontal and/or vertical lines unto the surface.

Pendulum assembly 20 may include a pendulum body 21, which supports the laser assemblies 40. Pendulum body 21 is preferably made of a nonferrous material, such as cast aluminum.

Figure 3A:
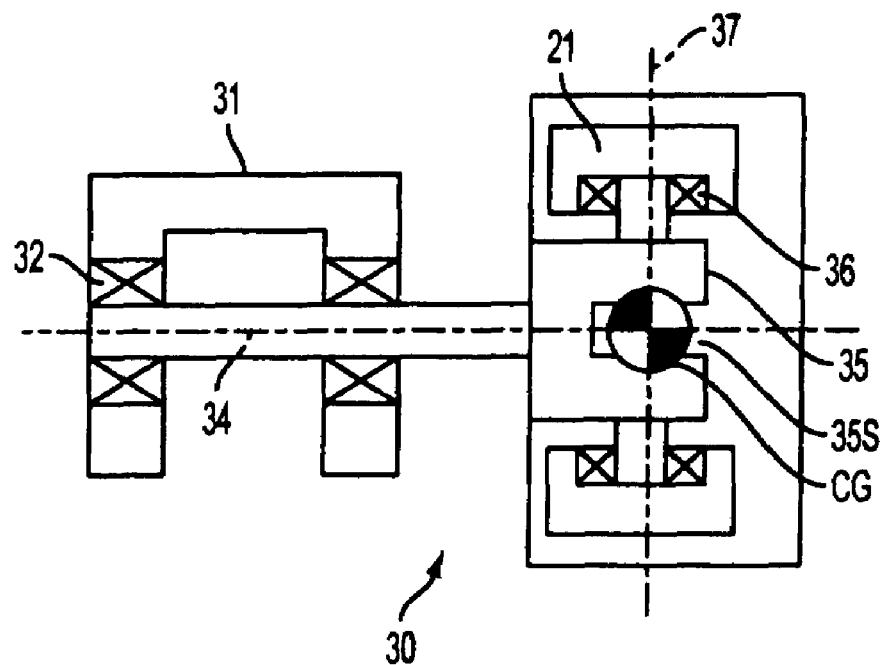
FIGS. 3A-3B are top plan views of a first and second embodiment of the gimbal assembly, respectively.

Referring to FIGS. 2-3, pendulum assembly 20 may be pivotally mounted to the housing 11 via gimbal assembly 30. A first embodiment of the gimbal assembly 30 is shown in FIG. 3A. Such assembly 30 may include a frame 31 attached to the housing 11. At least one and preferably two bearings 32 may be rotatably disposed on the frame 31. An axle 34 may be supported by the bearing(s) 32. Gimbal body 35 may be disposed on and rotate with axle 34.

Gimbal body 35 may have pins 37 extending outwardly. Pendulum body 21 may be rotationally connected to the pins 37 via at least one and preferably two bearings 36. Persons skilled in the art should recognize that the bearing(s) 32 may be disposed on axle 34, whereas the bearing(s) 36 can be disposed on the pins 37. Persons skilled in the art shall recognize that pins 37 may be replaced with a unitary pin or axle.

Preferably, pins 37 are coaxial and substantially perpendicular to axle 34. The axes of pins 37 and axle 34 preferably intersect at a point over the center of gravity CG of pendulum body 21.

Persons skilled in the art should also recognize that having frame 31, bearing(s) 32 and axle 34 behind the pendulum creates a shorter gimbal assembly 30 along a vertical axis. This in turn may allow the pendulum to be positioned closer to window 15.

A shorter gimbal assembly 30 may also allow the vertical laser assembly 40 to project the vertical planar beam VP (and thus vertical line VL) that extends behind axle 37, as shown in FIG. 2. Similarly, the shorter gimbal assembly 30 may allow the vertical laser assembly 40 to project the vertical planar beam VP (and thus vertical line VL) that extends behind the center of gravity CG of pendulum body 21. Such arrangement increases the visibility of the vertical line VL on a ceiling above a user's head.

Gimbal body 35 may have a slot 35S to allow vertical planar beam VP to project through gimbal body 35 and/or through the axis of pins 37.

Persons skilled in the art will recognize that the gimbal assembly 30 preferably has a pair of bearings (e.g., bearings 32) not disposed between the other pair of bearings (e.g., bearings 36). In other words, a pair of bearings (e.g., bearings 32) may be disposed on one side of the axis of rotation defined by the other pair of bearings (e.g., bearings 36). Accordingly, the center of gravity CG is still between one pair of bearings (bearings 36), though not both pairs.

Figure 3B:
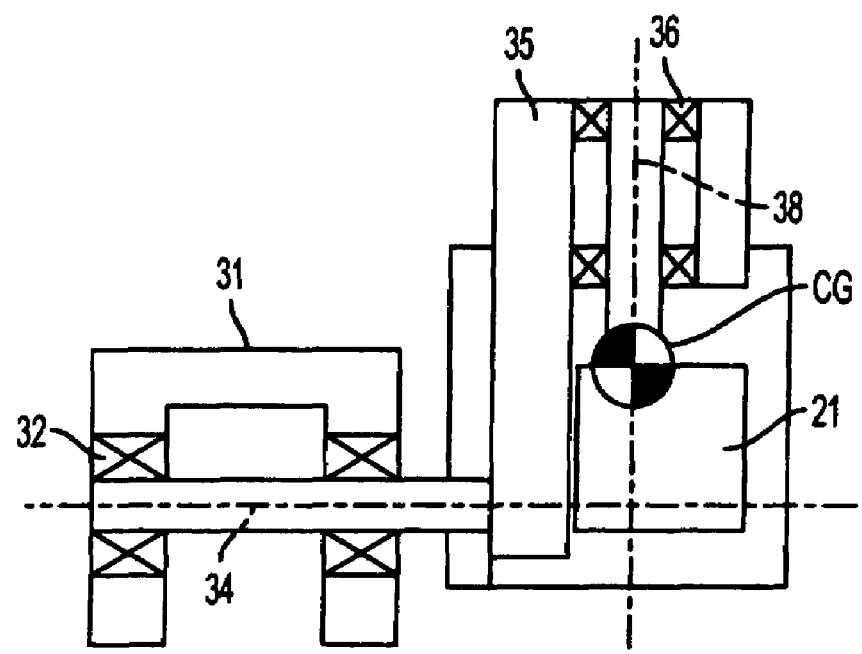

An alternate embodiment of gimbal assembly 30 may be seen in FIG. 3B, where like parts refer to like numerals. As seen in FIG. 3B, gimbal body 35 is no longer substantially between bearings 36. Instead, gimbal body 35 preferably extends sideways and supports bearings 36. Pendulum body 21 in turn may have an axle 38, which is pivotally supported by bearings 36. Persons skilled in the art will recognize that, like in the previous embodiment, the axes of axles 34, 38 substantially perpendicular, and that at least one pair of bearings is not disposed between the other pair of bearings. Persons skilled in the art will recognize that the center of gravity CG may be coplanar with the rotational axis of with axle 38, and that center of gravity CG may not need to be directly underneath the intersection of the axes of axles 34, 38.

Referring to FIG. 2, pendulum body 21 may threadingly receive at least one set screw 23 to ensure the proper balancing of the pendulum assembly 20. During assembly, set screw 23 would be rotated to provide the proper balance, and then fixed in position with a locking compound, such as Loc-Tite, etc. Set screw 23 may support one or more nuts 23N threadingly disposed thereon to further ensure the proper balancing of the pendulum assembly 20.

Pendulum body 21 may also have a bottom plate 22. Bottom plate 22 may be made of copper. A rubber piece or O-ring 220 may be provided on the bottom plate 22 or elsewhere on the pendulum body 21 (such as rubber piece or O-ring 240) to deaden any vibrating, and thus limit rattling of the pendulum assembly 20. Bottom plate 22 may magnetically interact with a magnet 15 disposed in housing 11 for magnetically damping pendulum assembly 20, as is well known in the art.

Pendulum body 21 may have a laser barrel 25 for holding each laser assemblies 40. As shown in FIG. 2, the laser barrels 25 (and thus laser assemblies 40) are preferably disposed side-by-side, rather than one arranged on the top of the other. Such arrangement reduces the height of the pendulum body 21 and/or of the laser level 10.

Persons skilled in the art will also recognize that the axes of the laser barrels 25 are preferably neither parallel nor coplanar. The laser barrel 25 supporting the vertical laser assembly 40 is preferably inclined relative to the laser barrel 25 supporting the horizontal laser assembly 40. In particular, the laser barrel 25 supporting the vertical laser assembly 40 is preferably inclined upwardly at an angle of about 40 degrees from a horizontal line.

Figure 4A:
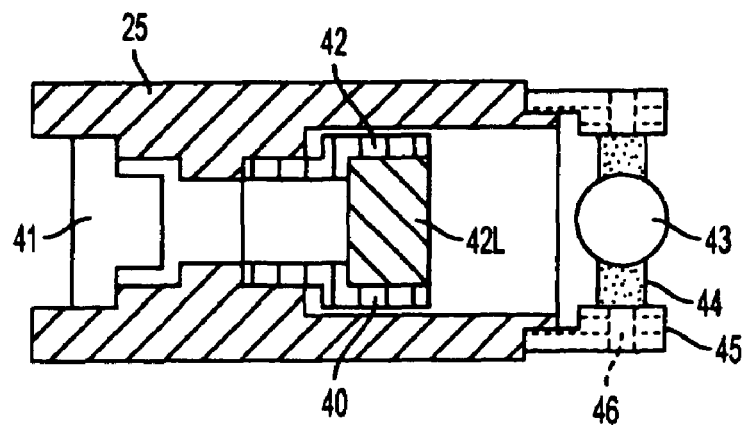
FIGS. 4A-4B are partial cross-section and a partial perspective views of the laser assembly, respectively.
Figure 4B:
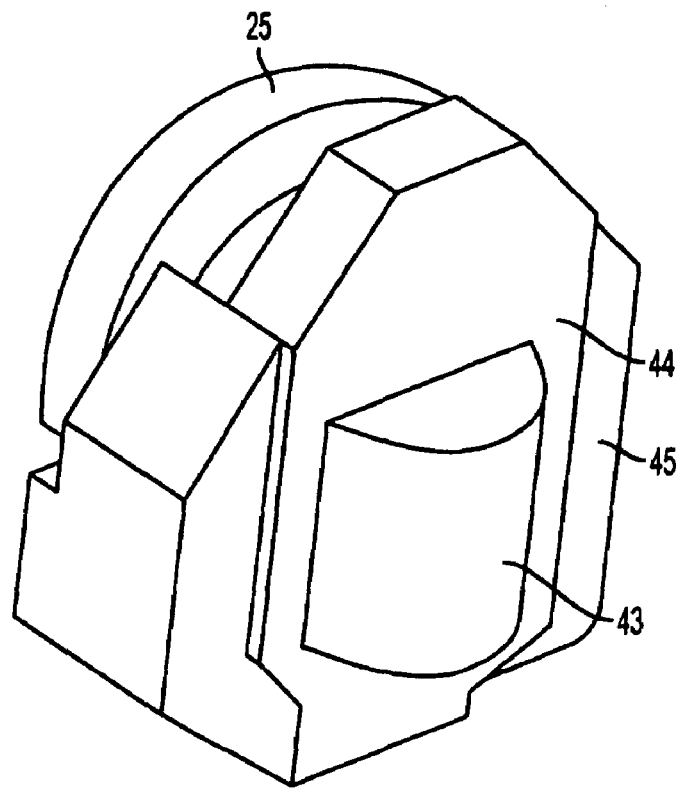

Referring to FIG. 4, the laser assemblies 40 may be assembled as follows. First, a laser diode 41 is inserted into one side of laser barrel 25. The laser diode 41 may be affixed to laser barrel 25 via a press fit, glue, a locking compound (such as Loc-Tite), a cap, or a set screw, etc.

A collimating lens holder 42 supporting collimating lens 42L is inserted into the other side of laser barrel 25. Collimating lens holder 42 may be made of aluminum. Collimating lens holder 42 may be affixed to laser barrel 25 via glue, a locking compound (such as Loc-Tite), a cap, or a set screw, etc.

A line or cylindrical lens 43 is preferably inserted into a lens holder 44. The lens holder 44 is then pivotally attached to barrel connector 45 via a pin 46. The barrel connector 45 is then disposed on laser barrel 25. Lens holder 44 and/or barrel connector 45 may be made of brass.

The lens holder 44 is preferably rotated about pin 46 to eliminate line crowning. The lens holder 44 is then glued in place unto barrel connector 45. The barrel connector 45 is then rotated about its longitudinal axis to the appropriate orientation. The barrel connector 45 is then glued in place to laser barrel 25. Persons skilled in the art will recognize that a locking compound, such as Loc-Tite, etc., may be used fix the position of lens holder 44 and/or barrel connector 45.

Persons skilled in the art will recognize that such arrangement allows for adjustment along two axes with a minimal number of components. Such arrangement may also ensure that the lens holder 44 and/or barrel connector 45 maintain constant clearance gaps within the assembly to provide optimal and consistent glue joint properties. Furthermore, such assembly does not necessitate any adjustment screws or springs.

As mentioned above, a window 15 may be mounted to housing 11 to allow the laser beams to exit housing 11. Referring to FIGS. 1 and 5, window 15 is preferably made of glass. It is preferable to mount such window 15 to housing 11 in a way that protects against breakage and also avoids the quality issues associated with adhesive mounting.

Figure 5A:
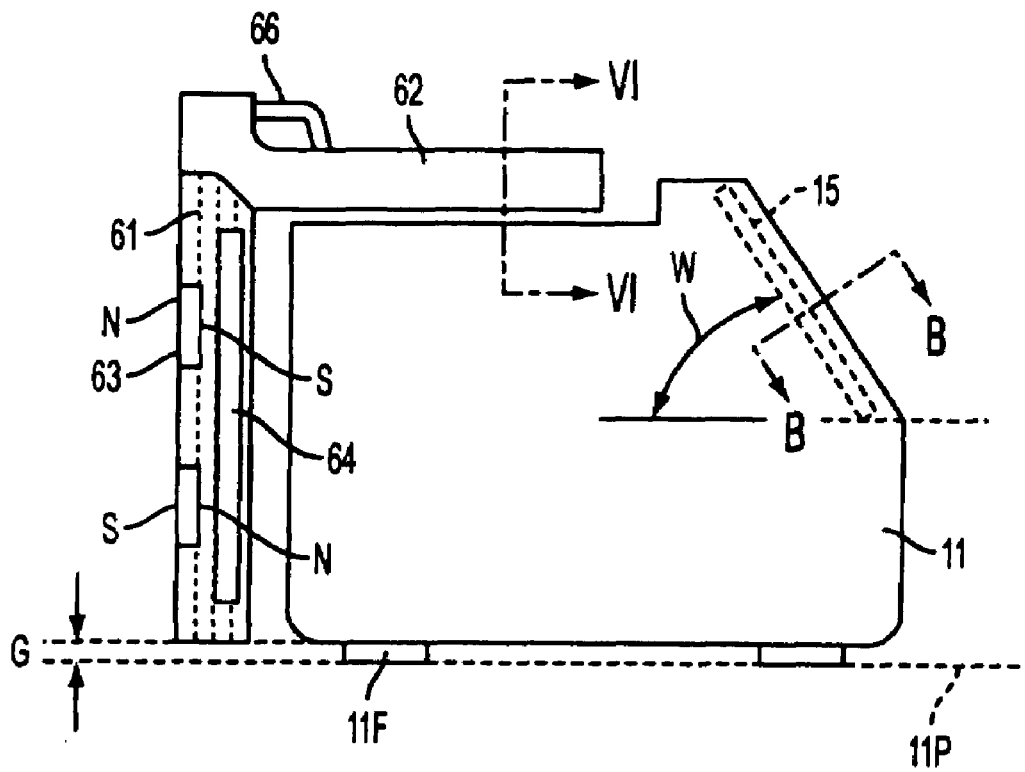
FIG. 5A is a side view.
Figure 5B:
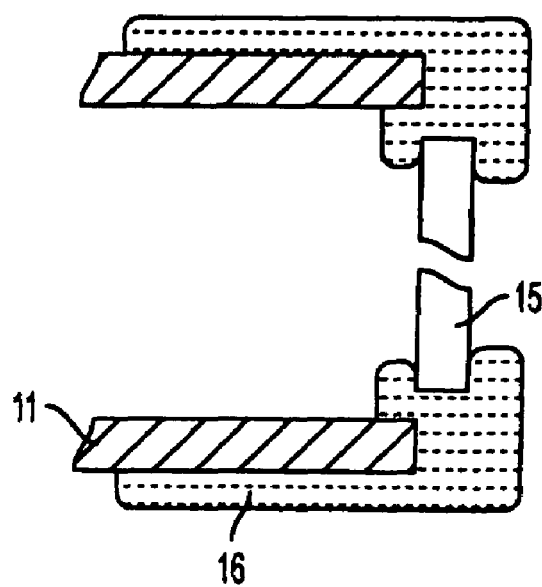
FIG. 5B is a partial cross-sectional view along line B-B of FIG. 5A.

Window 15 may be mounted to housing 11 by overmolding the two components with a layer 16 of compliant elastomeric material disposed on housing 11. Such material may be a thermoplastic urethane, such as Versollan. Housing 11 is preferably is made of plastic, such as Xenoy. As shown in FIG. 5B, layer 16 supports window 15 on the front and rear sides thereof. Such mounting arrangement preferably results in a complete seal that is free of messy adhesive. Such seal may also be waterproof or water resistant. Furthermore, due to the elastomeric material suspending the glass, the mounting arrangement has natural flexural properties, which may protect window 15 if laser level 10 is dropped or impacted.

It is preferable to dispose window 15 at an angle relative to a horizontal line. Referring to FIG. 5A, window 15 is disposed at an angle W of such horizontal line. Preferably, angle W is about 55 degrees. Persons skilled in the art will recognize that angle W is preferably larger than angle A.

Persons skilled in the art should recognize that it is preferable to substantially cover housing 11 with the same elastomeric material of layer 16. Such layer 16 may provide other features, such as feet 11F disposed at the bottom of housing 11. Due to the qualities of such material, feet 11F may provide an anti-skid function in addition to stably supporting the housing 11.

Persons skilled in the art should also recognize that housing 11 and/or layer 16 may have indicia 11I thereon to indicate to the user the typical position of vertical line VL and/or horizontal line HL relative to housing 1.

Referring to FIG. 2, it is preferable to provide laser level 10 with a pendulum detecting mechanism 50 to detect when the housing 11 is tilted beyond a self-leveling 20 range, i.e., where the pendulum body 21 is not be able to move to a substantially vertical position in order to generate a truly horizontal and/or vertical line.

Detecting mechanism 50 may include at least three (and preferably four) pairs 51 of infrared (IR) transmitters 51T and receivers 51R. Preferably, the pairs 51 are disposed equidistantly from pendulum body 21, and to each other.

Persons skilled in the art will recognize that transmitter 51T is preferably disposed above receiver 51R, or vice versa. A gap exists between transmitter 51T and receiver 51R allowing plate 22 to extend therebetween and interrupt the IR beam. When the beam is interrupted, a circuit monitoring the pairs 51 enables an out-of-range signal. When such signal is enabled, a microprocessor intermittently turns the laser assemblies 40 on and off in order to indicate such situation.

Persons skilled in the art will also recognize that the transmitter/receiver pairs 51 may be disposed in such positions where the plate 22 extends between a pair (thus triggering the out-of-range signal) before the pendulum body 21 contacts the housing 11 or any other component thereof. Such arrangement provides for more accurate detection of the out-of-self-leveling-range situation.

Rubber bumpers 52 may be disposed near the transmitter/receiver pairs 51 to limit the range of movement of the plate 22 (and thus of pendulum body 21).

Figure 6:
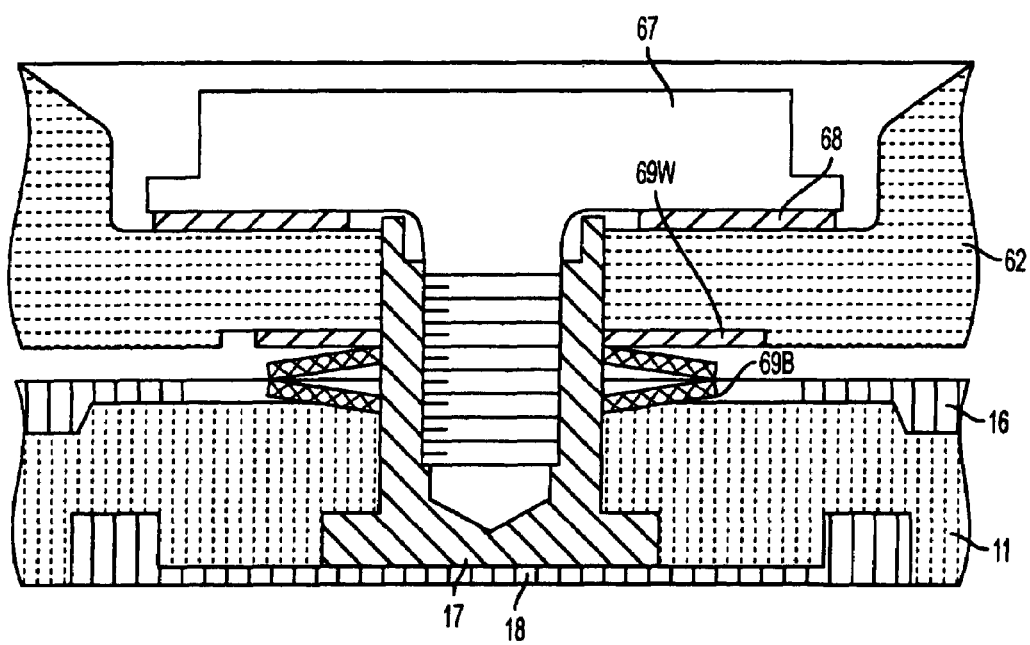
FIG. 6 is a partial cross-sectional view along line VI-VI of FIG. 5A.

Referring to FIGS. 1 and 5-6, laser level 10 may have a pivotable mount assembly 60 pivotably attached to housing 11. Mount assembly 60 may include a substantially vertical body 61 disposed relatively close to housing 11, and a substantially horizontal flange 62 extending from body 61 and pivotably engaging housing 11.

Preferably flange 62 is disposed above housing 11. Persons skilled in the art will recognize that, if flange 62 is disposed above housing 11, and the lowest portion of body 61 is disposed above a plane IP containing the lowest points of housing 11 (creating a gap G therebetween), the user will be able to dispose the laser level 10 on a horizontal surface without removing mount assembly 60.

Persons skilled in the art will recognize that disposing body 61 relatively close to housing 11 minimizes the size of laser level 10. In addition, such placement could prevent damage to body 61 if laser level 10 is dropped, as body 61 does not have a lot of room to bend.

Body 61 may have at least one magnet 63 and preferably two magnets 63 thereon. Such magnet(s) 63 allow the user to mount laser level 10 to a metal surface or rail. If multiple magnets 63 are used, t is preferable that the polarities of magnets 63 are not aligned. As shown in FIG. 5A, a top magnet 63 may be disposed so that its north and south poles are directed towards the rear and front of body 61, respectively, while a bottom magnet 63 may be disposed so that its north and south poles are directed towards the front and rear of body 61, respectively. Otherwise, the magnetic fields could affect the level position of pendulum body 21. Magnet(s) 63 may be insert molded in body 61.

It may be preferable to provide a metal plate 64 in body 61 between the magnet(s) 63 to conduct or shunt the magnetic field therebetween, thus minimizing the magnetic disturbance to pendulum body 21. Plate 64 may be insert molded in body 61.

It is preferable to provide feet 61R on the rear of body 61 to separate body 61 (and more specifically magnet(s) 63) from the metal surface. Such gap will allow the user to easily move laser level 10 along the metal surface.

Such feet 61F may be made of rubber. Such material would increase friction between the metal surface and laser level 10.

Preferably, mount assembly 60 is permanently attached to housing 11. Permanently attaching mount assembly 60 to housing 11 ensures that the user does not lose the mount assembly 60 after detaching it.

Mount assembly 60 can be attached to housing 11 via a screw 67 threadingly engaging housing 11. Screw 67 may be made of steel. Alternatively, screw 67 may be threadingly engaged to an insert 17 disposed on housing 11. Insert 17 may be made of brass. Screw 67 may extend through a hole in flange 62.

A washer 68 may be disposed between screw 67 and flange 62. Washer 68 is preferably made of plastic. Persons skilled in the art will know to select a plastic to ensure low friction between screw 67 and flange 62.

A washer 69W may be disposed between flange 62 and housing 11. Persons skilled in the art will know to select a plastic to ensure low friction between housing 11 and flange 62. A couple of Belleville washers 69B may be disposed between housing 11 and washer 69W. Such arrangement will take up any play between flange 62 and housing 11. Persons skilled in the art will recognize that such arrangement may also ensure that a constant force exists between flange 62 and housing 11. Such constant force allows for smooth rotation of the housing 11 relative to mount assembly 60.

It is preferable to overmold a layer 18 underneath insert 17. Layer 18 may be an elastomeric material such as a thermoplastic urethane or Versollan.

Body 61 may have a notch 61N aligned to indicia 11I to indicate to the user the typical position of horizontal line HL relative to housing 11 and/or body 61.

Body 61 may have a key hole 65 for hanging laser level from a nail or screw in a wall or reference surface.

Body 61 and/or flange 62 may have a hole 66 that can receive a wire or rope for tying laser level 10 to a feature to prevent any possible falls.

Figure 7A:
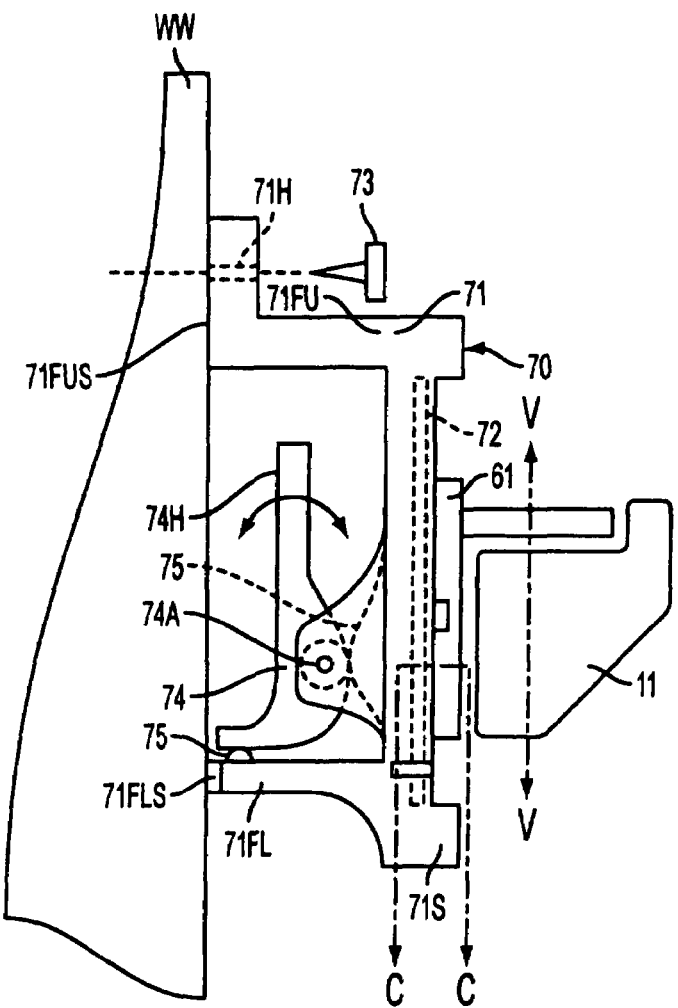
FIG. 7A is a side view.

Referring to FIG. 7, laser level 10 may be disposed on a wall mount assembly 70. Wall mount assembly 70 may include a body 71, an upper flange 71FU, and a lower flange 71FL. Preferably body 71 is substantially vertical, whereas upper and lower flanges 71FU, 71FL are preferably substantially horizontal. Upper and lower flanges 71FU, 71FL preferably have respective surfaces 71FUS, 71FLS that are substantially coplanar and preferably substantially vertical, so that wall mount assembly 70 can be stably disposed against a wall WW. Upper flange 71FU may also have a hole 71H for allowing a screw or nail 73 to extend therethrough to affix wall mount assembly 70 to wall WW.

Wall mount assembly 70 may have a metal plate 72 disposed in body 71. Preferably plate 72 is made of steel. Plate 72 may be insert molded in body 71. With such construction, the user need only place mount assembly 60 against body 71 for installation, as magnet(s) 63 will magnetically engage plate 72.

Because the laser level 10 is magnetically mounted to wall mount assembly 70, the user can easily move the laser level 10 relative to wall mount assembly 70 by sliding laser level 10 up or down along axis V. To facilitate such movement, it is preferable to create a gap between plate 72 and magnet(s) 63.

Figure 7B:
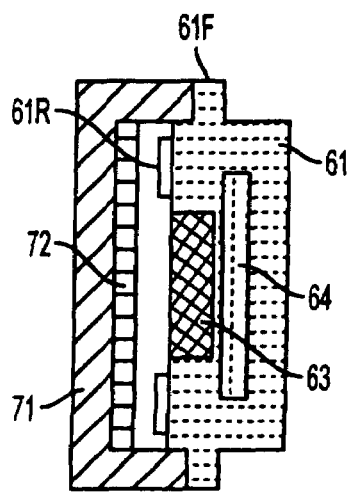
FIG. 7B is a partial cross-sectional view along line C-C of FIG. 7A.

Such gap can be created by providing body 61 with protrusions or flanges 61F extending outwardly from body 61. As shown in FIG. 7B, flanges 61F contact body 71 and prevent direct contact between plate 72 and magnet(s) 63. Persons skilled in the art will recognize that it is preferable to design flanges 61F so that feet 61R do not contact plate 72.

Body 71 may also have protrusions 71S. As laser level 10 is moved upwardly or downwardly along body 71, such protrusions 71S would contact a feature of mount assembly 60 (such as flanges 61F) to prevent the user from moving laser level 10 beyond such protrusions. Such protrusions 71S also prevent laser level 10 from sliding off body 71.

Wall mount assembly 70 may have a clamp 74 pivotably attached to body 71 about an axis 74A. Clamp 74 may have a spring 75 biasing the clamp 74 towards a surface of wall mount assembly 70, such as lower flange 71FL, for pinching a ceiling rail or extrusion therebetween, thus clamping wall mount assembly 70 to such ceiling rail, extrusion, etc. Persons skilled in the art will recognize that clamp 74 and/or the other surface of wall mount assembly 70, such as lower flange 71FL, may have a rubber foot 75 in the clamping area to better grip the extrusion.

The user can move clamp 74 to release wall mount assembly 70 by rotating clamp 74 about axis 74A by pushing on handle 74H.

Persons skilled in the art will recognize that wall mount assembly 70 can be mounted in a first orientation where upper flange 71FU is above lower flange 71FL and a second orientation where upper flange 71FU is below lower flange 71FL.

Persons skilled in the art may recognize other additions or alternatives to the means disclosed herein. However, all these additions and/or alterations are considered to be equivalents of the present invention.

What is claimed is:

1. A laser level comprising:
    a housing;
    a pendulum assembly located within the housing having a center of gravity,
    a laser diode assembly in the housing supported by the pendulum assembly; and
    a window mounted to the housing to allow laser beams generated from the laser diode assembly to exit the housing,
    wherein the laser diode assembly is aligned to generate a planar beam such that a laser line is projected through the window and extends behind the center of gravity of the pendulum assembly on a surface.

2. The laser level of claim 1, wherein the laser diode assembly comprises:
    a first laser diode assembly that is aligned to generate a vertical planar beam such that a vertical laser line is projected through the window on a surface; and a second laser diode assembly that is aligned to generate a horizontal planar beam such that a horizontal laser line is projected through the window on the surface.

3. The laser level of claim 2, wherein the first laser diode assembly is aligned to generate a vertical planar beam such that a vertical laser line is projected through the window and extends behind the center of gravity of the pendulum assembly on a surface.

4. The laser level of claim 1, wherein the housing has a horizontal axis and the window is mounted to the housing at an angle relative to the horizontal axis.

5. The laser level of claim 4, wherein the window is disposed at a substantially acute angle of from the horizontal axis.

6. The laser level of claim 4, wherein the window is disposed at an angle of substantially 55 degrees from the horizontal axis.

7. The laser level of claim 1, wherein the window is mounted to the housing using an overmolded layer of material disposed on the housing.

8. The laser level of claim 7, wherein the overmolded layer of material includes an elastomeric material.

9. The laser level of claim 7, wherein the overmolded layer covers substantially the entire housing.

10. The laser level of claim 9, wherein the overmolded layer further comprises a plurality of feet, wherein the feet provide stability to the housing as well provide an anti-slip function.

11. A method for assembling a laser diode assembly for a laser level comprising the steps of:
    (a) inserting a laser diode into one end of a laser barrel;
    (b) inserting a first lens holder having a first lens into the other side of the laser barrel;
    (c) pivotally attaching a second lens holder having a second lens to a barrel connector, having a longitudinal axis, via a pin;
    (d) disposing the barrel connector on the laser barrel;
    (e) rotating the second lens holder around the pin until the desired orientation is met; and
    (f) rotating the barrel connector around its longitudinal axis until the desired orientation is met.

12. The method of claim 11, wherein step (a) further comprises the step of: (1) affixing the laser diode to the laser barrel.

13. The method of claim 12, wherein the laser diode is affixed to the laser barrel by one of a press fit, a locking compound, or a fastener.

14. The method of claim 11, wherein step (b) further comprises the step of: (1) affixing the first lens holder to the laser barrel.

15. The method of claim 14, wherein the first lens holder is affixed to the laser barrel by one of a press fit, a locking compound, or a fastener.

16. The method of claim 11, wherein the first lens is a collimating lens.

17. The method of claim 11, wherein step (e) further comprises the step of: (1) affixing the second lens holder to the barrel connector.

18. The method of claim 17, wherein the second lens holder is affixed to the barrel connector by one of a press fit, a locking compound, or a fastener.

19. The method of claim 11, wherein the second lens is a cylindrical lens.

20. The method of claim 11, wherein step (f) further comprises the step of: (1) affixing the barrel connector to the laser barrel.

21. The method of claim 20, wherein the barrel connector is affixed to the laser barrel by one of a press fit, a locking compound, or a fastener.

* * * * *